US012449543B2

(12) United States Patent
Das et al.

(10) Patent No.: US 12,449,543 B2
(45) Date of Patent: *Oct. 21, 2025

(54) OUT OF SEQUENCE PERCEPTION SYSTEM (71) Applicant: Zoox, Inc., Foster City, CA (US)

(72) Inventors: Subhasis Das, San Mateo, CA (US); Chuang Wang, Woodside, CA (US); Sabeek Mani Pradhan, Redwood City, CA (US)

(73) Assignee: Zoox, Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/417,356

(22) Filed: Jan. 19, 2024

(65) Prior Publication Data
US 2024/0241257 A1 Jul. 18, 2024

Related U.S. Application Data (63) Continuation of application No. 16/549,694, filed on Aug. 23, 2019, now Pat. No. 11,879,978.

(51) Int. Cl.
G01S 17/89 (2020.01)
B60W 60/00 (2020.01)
(Continued)

(52) U.S. Cl.
CPC ....... *G01S 17/89* (2013.01); *B60W 60/00272* (2020.02); *G01C 21/3492* (2013.01);
(Continued)

(58) Field of Classification Search
CPC ........ G01S 17/89; G01S 19/393; G01S 7/003; G01S 7/4802; G01S 17/42; G01S 17/58;
(Continued)

(56) References Cited

U.S. PATENT DOCUMENTS 9,097,800 B1* 8/2015 Zhu ................. G01S 13/931
2017/0124781 A1* 5/2017 Douillard ............ G08G 1/207
2020/0406893 A1* 12/2020 Choe ................ G01C 21/3602

OTHER PUBLICATIONS

Cho, H. et al., "A Multi-Sensor Fusion System for Moving Object Detection and Tracking in Urban Driving Environments," 2014 IEEE International Conference on Robotics and Automation (ICRA), Hong Kong China, 2014, pp. 1836-1843, doi: 10.1109/ICRA.2014. 6907100. (Year: 2014).*

(Continued)

Primary Examiner — Amandeep Saini
Assistant Examiner — Daniella M. DiGuglielmo
(74) Attorney, Agent, or Firm — Lee & Hayes, P.C.

(57) ABSTRACT

Techniques for updating data operations in a perception system are discussed herein. A vehicle may use a perception system to capture data about an environment proximate to the vehicle. The perception system may receive image data, lidar data, and/or radar data to determine information about an object in the environment. As different sensors may be associated with different time periods for capturing and/or processing operations, the techniques include updating object data with data from sensors associated with a shorter time period to generate intermediate object data. Such intermediate object data may reduce a delay in updating a position of an object in an environment.

20 Claims, 7 Drawing Sheets (51) Int. Cl.

| | |
|---|---|
| *G01C 21/34* | (2006.01) |
| *G01S 7/00* | (2006.01) |
| *G01S 17/42* | (2006.01) |
| *G01S 17/58* | (2006.01) |
| *G01S 17/86* | (2020.01) |
| *G01S 17/931* | (2020.01) |
| *G01S 19/39* | (2010.01) |
| *G05D 1/00* | (2024.01) |
| *G06N 3/0455* | (2023.01) |
| *G06N 3/0464* | (2023.01) |
| *G06N 3/047* | (2023.01) |
| *G06N 3/0475* | (2023.01) |
| *G06N 3/084* | (2023.01) |
| *G06N 5/01* | (2023.01) |
| *G06N 7/01* | (2023.01) |
| *G06N 20/00* | (2019.01) |
| *G06N 20/10* | (2019.01) |
| *G06N 20/20* | (2019.01) |

(52) U.S. Cl.
CPC .............. *G01S 7/003* (2013.01); *G01S 17/42* (2013.01); *G01S 17/58* (2013.01); *G01S 17/86* (2020.01); *G01S 19/393* (2019.08); *G05D 1/0221* (2013.01); *G05D 1/0223* (2013.01); *G06N 3/0464* (2023.01); *G06N 20/00* (2019.01); *B60W 2420/408* (2024.01); *G01C 21/343* (2013.01); *G01S 17/931* (2020.01); *G06N 3/0455* (2023.01); *G06N 3/047* (2023.01); *G06N 3/0475* (2023.01); *G06N 3/084* (2013.01); *G06N 5/01* (2023.01); *G06N 7/01* (2023.01); *G06N 20/10* (2019.01); *G06N 20/20* (2019.01)

(58) Field of Classification Search
CPC ........ G01S 17/66; G01S 17/86; G01S 17/931; G01C 21/3492; G01C 21/343; G05D 1/0221; G05D 1/0223; G06N 20/00; G06N 3/0455; G06N 3/0464; G06N 3/047; G06N 3/0475; G06N 3/084; G06N 5/01; G06N 7/01; G06N 20/10; G06N 20/20; B60W 2420/408; B60W 60/00272

See application file for complete search history.

(56) References Cited

OTHER PUBLICATIONS

"Out of Sequence Perception & Fusion Tracker," created by Chris Wang, Jan. 29, 2018.

Bar Shalom, "Update with Out-of-Sequence Measurements in Tracking: Exact Solution," IEEE Transactions on Aerospace and Electronics Systems, vol. 38, No. 3, Jul. 2002, pp. 769-778.

Bar-Shalom, et al., "One-Step Solution for the Multistep Out-of-Sequence-Measurement Problem in Tracking," IEEE Transactions on Aerospace and Electronic Systems, vol. 40, No. 1, Jan. 2004, pp. 27-37.

Cho, et al., "A Multi-Sensor Fusion System for Moving Object Detection and Tracking in Urban Driving Environments", 2014 IEEE International Conference on Robotics and Automation ( ICRA), doi: 10.1109/ICRA.2014.69707100., 2014, pp. 1836-1843.

Gohring, et al., "Radar/Lidar Sensor Fusion for Car-Following on Highways", The 5th International Conference on Automation, Robotics and Applications, 2011, doi: 10.1109/ICARA.2011.6144918., 2011, pp. 407-412.

Kocic, et al., "Sensor and Sensor Fusion in Autonomous Vehicles", 2018 26th Telecommunications Forum ( TELFOR), doi:10.1109/TELFOR.2018.8612054, 2018, pp. 420-425.

Office Action for U.S. Appl. No. 16/549,694, mailed on Mar. 23, 2022, Das, "Out of Sequence Preception System", 38 pages.

Office Action for U.S. Appl. No. 16/549,694, mailed on Jun. 5, 2023, Das, "Out of Sequence Preception System", 49 pages.

Office Action for U.S. Appl. No. 16/549,694, mailed on Nov. 30, 2022, Das, "Out of Sequence Preception System", 43 pages.

\* cited by examiner

OUT OF SEQUENCE PERCEPTION SYSTEM

CROSS REFERENCE TO RELATED APPLICATIONS

This application is a continuation of and claims priority to commonly assigned, co-pending U.S. patent application Ser. No. 16/549,694, filed Aug. 23, 2019. Application Ser. No. 16/549,694 is fully incorporated herein by reference.

BACKGROUND

A navigation system for an autonomous vehicle often includes a perception system, which utilizes a variety of data from sensors on board the autonomous vehicle. The perception system allows the autonomous vehicle to recognize objects in the physical environment so that the autonomous vehicle can plan a safe route through the environment. The safe operation of an autonomous vehicle depends at least in part on information made available by the perception system in detecting, classifying, and predicting motion of objects. However, conventional perception systems may require significant processing between capturing data and making a determination about such data. This shortcoming may be significant in view of objects, such as vehicles, that change their trajectory in a relatively short span of time. Thus, out of date sensor data or high latency provided by such detection, classification, and/or prediction of objects may reduce the safety of the operation of the autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques described herein are directed to data updating operations in an out of sequence perception system. In general, autonomous systems, such as vehicles, often use a perception system processing various types of sensor data to identify objects and predicted trajectories of those objects in order to safely navigate around the objects and, thereby, avoid collisions. The out of sequence perception system, described herein, may be implemented in such the autonomous vehicles to reduce latency associated with and improve recency of sensor data used to make critical navigation decisions. For example, the out of sequence perception system may perform updates on object perception tracks or object state data, such as position, orientation, velocity, historical state, semantic information, etc., using radar data captured outside of and in addition to maintaining a full object tracking update pipeline.

In some implementations, the out of sequence perception system may use a plurality of sensor modalities in determining data (e.g., an object track) about an object in an environment. For example, the out of sequence perception system (also referred to as a perception system) may receive sensor data captured by an image sensor, a lidar sensor, a radar sensor, and the like. The perception system and/or each of the sensors used to capture data may operate at a particular frequencies (e.g., 1 hertz, 5 Hz, 10 Hz, etc.) to generate sensor data and/or object data at any interval. Within each interval, the sensor data captured by the different sensor modalities may be associated with different processing operations prior to determining the object data. For example, lidar data may be processed once within an interval to determine object data based on the lidar data, while image data and/or radar data may be processed more frequently than the lidar data within one interval. For example, in the context of radar data, four (or any number of) radar measurements may be received for individual processed lidar data operation. However, rather than waiting to generate object data at the rate associated with the lidar data, the out of sequence perception system can use intermediate radar data to generate updated object data, which may represent more accurate data in between such lidar updates.

A full object tracking update pipeline (e.g., one that includes operations on all sensor modalities) may be executed once every 100 to 150 milliseconds on sensor data collected during a previous data processing interval. For example, the full object tracking update pipeline may capture data and/or preprocess and associate (or otherwise fuse) captured light detection and ranging (lidar), radar, and/or video and/or image data with existing object perception tracks (e.g., the output of a previous full object tracking update pipeline, such as pose (e.g., x, y, z, yaw, pitch, roll), velocity, acceleration, bounding boxes (2D and/or 3D), classification, etc. These data can make up the object track). The classification and association operations may be performed prior to outputting updated object perception tracks. Thus, in some cases, a time between capturing data and outputting a determination based on such data may be on the order of 200 and 300 milliseconds, depending on processing operations and available compute. In some specific instances, particularly at high speeds, a drastic change in speed or trajectory of an object, such as when a preceding vehicle rapidly brakes, a delay of a few millisecond can result in an emergency braking operation instead of a more comfortable deceleration (among other less desirable outcomes). Thus, the out of sequence perception system, described herein, is configured to reduce the overall delay caused by classification and association of sensor data and, thereby, provide an output to a prediction and/or planning system more representative of the real-life/real-time physical environment.

In some implementations, the out of sequence perception system may process sensor data (e.g., lidar, radar, video and/or image data, etc.) captured during a first time interval using a full object tracking update pipeline. For instance, the full object tracking update pipeline may classify objects represented by the sensor data, associate the classified or identified objects with objects of existing object perception tracks, and update the existing object perception tracks based at least in part on the association of the objects and the sensor data. Thus, the updated object perception tracks output by the full object tracking update pipeline may comprise data from some or all available types of sensors.

In addition to the full object tracking update pipeline, the out of sequence perception system may implement a "fast" object tracking update pipeline. The fast object tracking update pipeline may receive the existing object perception tracks as does the full object tracking update pipeline. In addition, the fast object tracking update pipeline may also receive additional radar data captured during a second and/or third time interval. Thus, the at least some of the sensor data received by the fast object tracking update pipeline is more recent than the sensor data being processed by the full object tracking update pipeline. Further, by using multiple observations and/or a Kalman filter, an uncertainty in such tracks may be reduced. The fast object tracking update pipeline may be configured to perform object association using the radar data and then update the object perception tracks. Thus, the fast object tracking update pipeline may incur less latency or processing time typically associated with object classification. In this manner, in addition to utilizing more recent sensor data, the fast object tracking update pipeline may update the object perception tracks in a small fraction of the time that the full object tracking update pipeline traditionally requires. As a result, at least a portion of the sensor data used to generate the output of the fast object tracking update pipeline is between 50 and 150 milliseconds more recent than the sensor data used to generate the output of the full object tracking update pipeline allowing the prediction and/or planning system to make operational decisions on more update and timely data (i.e., fast updates can be on the order of 50 milliseconds after the most recent full track incorporating all modalities).

The techniques discussed herein can improve a functioning of a computing device in a number of additional ways. In some cases, processing intermediate data in a fast object update pipeline reduces a size of memory buffer by processing data as it is available. In some examples, the updating an object track with more recent data provides a more accurate representation of object in an environment, which can allow vehicles (such as an autonomous vehicle) to react earlier than without the fast update operations. In some cases, updating object data may allow the autonomous vehicle to generate more accurate and/or safer trajectories for the autonomous vehicle to traverse an environment. For example, object data can be evaluated to determine a likelihood of a collision or a near-collision and may allow the autonomous vehicle to select or determine an action (e.g., change lanes, stop, etc.) in order to safely traverse the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers and/or a system to implement emergency maneuvers, such as emergency braking. In another example, the techniques can be utilized in an aviation or nautical context. Additionally, the techniques described herein can be used with real data (e.g., captured using sensor(s)), simulated data (e.g., generated by a simulator), or any combination of the two.

Figure 1:
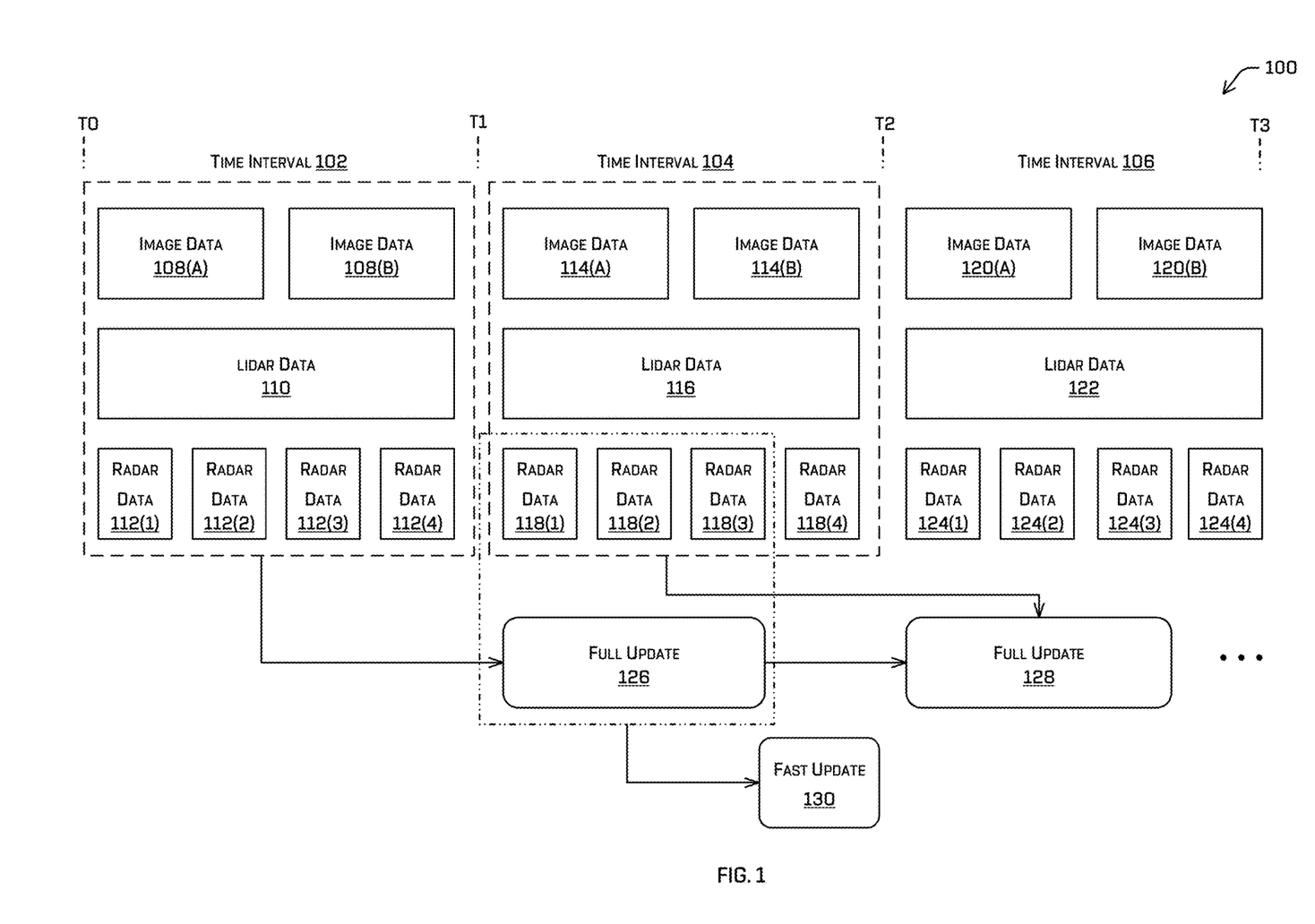
FIG. 1 is an example timing diagram illustrating an example data flow of an out of sequence perception system, as described herein.

FIG. 1 illustrates an example timing diagram 100 illustrating an example data flow of an out of sequence perception system, as described herein. The current example illustrates data collection, by one or more sensors, over a span of three time intervals 102, 104, and 106. In the illustrated example, each of the time intervals 102-106 are 100 milliseconds long (although such time intervals may represent any regular or irregular periods of time). During the time interval 102 (e.g., T0-T1), video data and/or image data 108(A) and 108(B), lidar data 110, and radar data 112(1)-(4) are captured. Similarly, during the time interval 104 (e.g., T1-T2), video and/or image data 114(A) and 114(B), lidar data 116, and radar data 118(1)-(4) are captured. Finally, during the time interval 106 (e.g., T2-T3), video and/or image data 120(A) and 120(B), lidar data 122, and radar data 124(1)-(4) are captured.

In the current example, the video and/or image data 108(A)-(B), lidar data 110, and radar data 112(1)-(4) captured during the time interval 102 may be processed as part of a full update 126 by a full object tracking update pipeline. Details of a full update 126 are discussed in U.S. application Ser. No. 16/147,328, which is herein incorporated by reference, in its entirety. The full update 126 may also receive object perception tracks output by a proceeding full update. As illustrated, the full update 126 may process the video and/or image data 108(A)-(B), lidar data 110, and radar data 112(1)-(4) to update the object perception tracks. The updated object perception tracks may be provided to a subsequent full update 128 as well as to a fast object tracking update pipeline.

The fast object tracking update pipeline may also receive additional radar data 118(1)-(4) and 124(1) and (4) and perform a fast update 130 using the updated object perception tracks output by the full update 126 and the radar data 118(1)-(4), 124(1), and 124(2). The output of the fast update 130 (e.g., object perception tracks updated with the more recent radar data 118(1)-(4), 124(1), and 124(2)) may be output to another system, such as a prediction and/or planning system.

Figure 2:
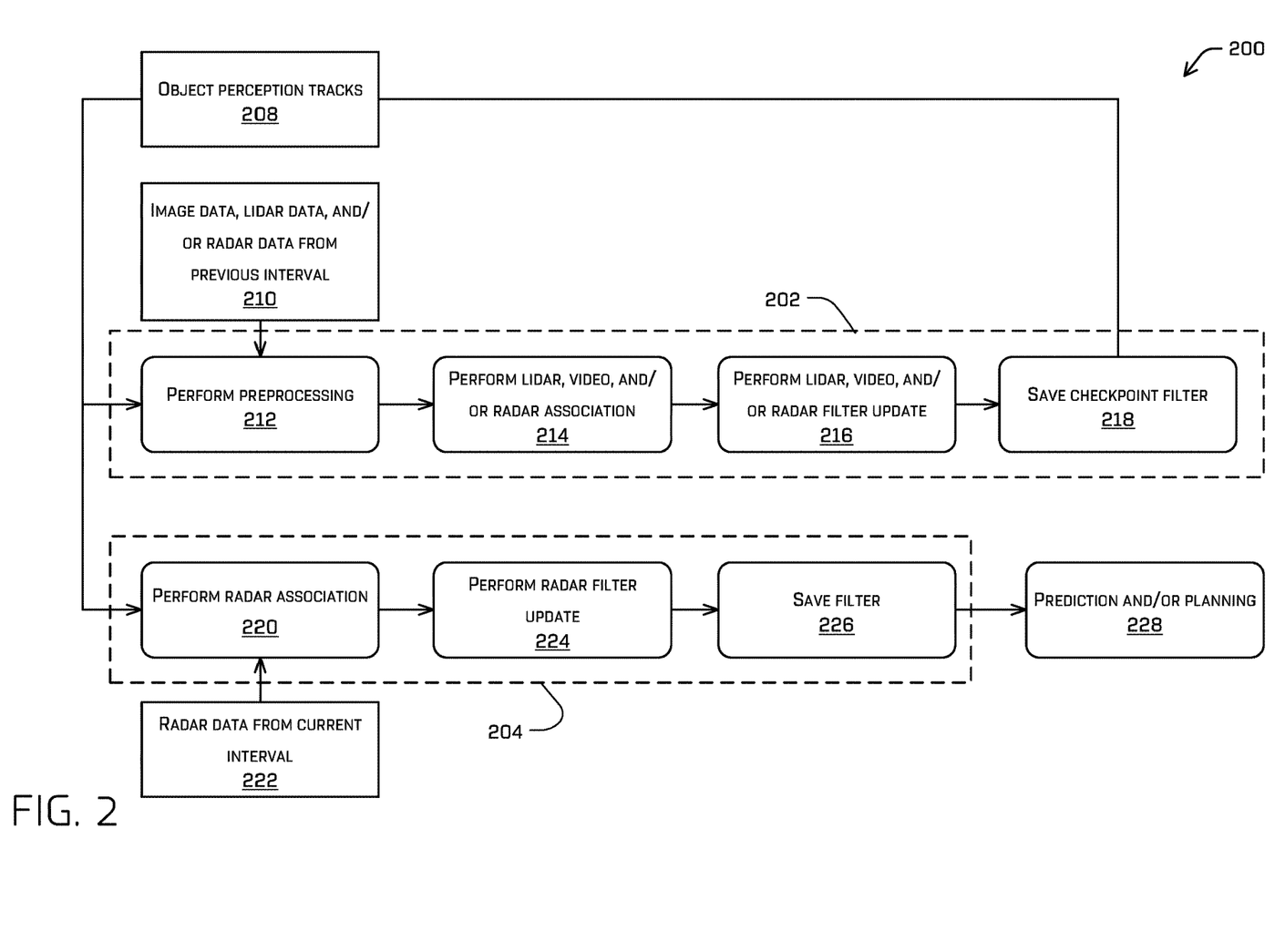
FIG. 2 is a block diagram illustrating an example process flow of the out of sequence perception system, as described herein.

As shown in the illustrated process flow diagram 200, the full update 126 completes approximately at time T1 (e.g., 100-150 milliseconds) after the video and/or image data 108(A)-(B), lidar data 110, and radar data 112(1)-(4) is captured and/or processed. During those 150 milliseconds, a state of the physical environment may have been altered, such as when a preceding vehicle brakes unexpectedly. In these situations, the prediction and/or planning system would be making operational decisions on out of date data if the fast update 130 was not implemented. Fortunately, as illustrated in the flow diagram 200, the fast update 130 completes approximately 50 milliseconds after the radar data 124(2) is captured. Thus, the fast update 130 may update the object perception tracks to reflect the changed physical circumstances using the radar data 118(1)-(4), 124(1), and 124(2). In this manner, the prediction and/or planning system may make operational decisions on more object perception tracks updated with more recent data and, thereby, reducing a risk of collision with another object.

With respect to FIG. 1, it should be understood, that video and/or image data 108, 114, and 120, lidar data 110, 116, and 122, and radar data 112, 118, and 124 are representations of data that may be captured and/or processed, and that any number of samples of video and/or image data, lidar data, and/or radar data may be captured or processed. Further, in other examples, additional types of data, such as, doppler, time of flight, audio data, etc., may also be collected and processed using the full object tracking update pipeline and/or fast object tracking update pipeline, as discussed above. Additionally, while each time interval is illustrated as 100 milliseconds, it should be understood that a time interval may vary in length of time and is not necessarily fixed at 100 milliseconds.

FIG. 2 is a block diagram illustrating an example process flow 200 of the out of sequence perception system, as described herein. As discussed above, the out of sequence perception system, described herein, includes both a full object tracking update pipeline 202 and a fast object tracking update pipeline 204. The output of the full object tracking update pipeline 202 from a preceding time interval may be provided to both the full object tracking update pipeline 202 and the fast object tracking update pipeline 204 to assist with maintaining accuracy of the object perception tracks. The output of the fast object tracking update pipeline 204 may be provided to the prediction and/or planning system 206 to ensure that operational decisions are based on more recent sensor data.

During individual time intervals, the full object tracking update pipeline 202 may receive object state data, such as object perception tracks 208, published by the full object tracking update pipeline 202 in a preceding time interval and video and/or image data, lidar data, radar data, and/or other types of sensor data 210 captured during the previous time interval. For example, the object perception tracks 208 may include object perception tracks updated during the preceding time interval. In some cases, other types of sensor data may include time-of-flight data, doppler data, gravitational data, location data, position or GPS data, inertial sensor data (e.g., inertial measurement unit data, accelerometer data, magnetometer data, gyroscope data, etc.), among others.

At 212, the object tracking update pipeline 202 performs preprocessing on the video and/or image data, lidar data, and radar data. For example, the full object tracking update pipeline 202 may perform techniques such as object detection, filtering, classification, segmentation, feature extraction, sparse features representation, pattern detection, white space detection, pixel correlation, feature mapping, etc. Details of preprocessing are discussed in U.S. application Ser. No. 16/147,328, which is herein incorporated by reference, in its entirety. In various examples, the full object tracking update pipeline 202 may utilize neural networks (e.g., deep neural networks, convolutional neural networks, etc.), regression techniques, among others to identify and categorize objects represented within the video and/or image data, lidar data, and radar data. In some cases, preprocessing may include determining an entity type (e.g., vehicle, pedestrian, cyclist, animal, building, tree, road surface, curb, sidewalk, unknown, etc.) of the object. In additional and/or alternative examples, preprocessing may include identifying one or more characteristics associated with a detected object. For example, characteristics associated with an object may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, rates of change of the velocity and/or acceleration, an extent of the entity (size), etc.

At 214, the full object tracking update pipeline 202 performs lidar, video, and/or radar association on the newly classified objects and the object perception tracks from the preceding full update. For example, the full object tracking update pipeline 202 may implement operations or techniques such as similarity of roles, geometry tracking or matching, velocity tracking, learned associations, geometry and velocity tracking or matching, position tracking, among others.

At 216, the full object tracking update pipeline 202 performs lidar, video, and radar filter update with respect to the object perception tracks. For example, the full object tracking update pipeline 202 may utilize Kalman or extended Kalman filters, particle filters, Gauss-Newton Filter, among others when implementing the filter updates.

At 218, the object tracking update pipeline 202 saves the checkpoint filter and the object perception tracks 208 publishes for use as an input into the next full object tracking update pipeline 202 and the fast track fast object tracking update pipeline 204.

During individual time intervals and substantially concurrently with the full object tracking update pipeline 202, the fast object tracking update pipeline 204 may receive current, additional, or radar data 222 form the current interval. For example, as discussed above with respect to FIG. 1, radar data 222 may be captured while the full object tracking update pipeline 202 is processing.

At 220, the fast object tracking update pipeline 204 may perform radar association between the radar data 222 and the object perception tracks 208 of the full update. In some cases, the fast object tracking update pipeline 204 may utilize the same association techniques and/or models as the object tracking update pipeline 202. However, in alternative cases, the fast object tracking update pipeline 204 may utilize a portion and/or subset of the same association techniques and/or models as the object tracking update pipeline 202 or different association techniques and/or models from the object tracking update pipeline 202.

At 224, the fast object tracking update pipeline 204 may perform radar filter update and, at 226, the fast object tracking update pipeline 204 may save the filter. In some cases, the fast object tracking update pipeline 204 may utilize the same filtering techniques and/or models as the object tracking update pipeline 202. However, in alternative cases, the fast object tracking update pipeline 204 may utilize a portion and/or subset of the same filtering techniques and/or models as the object tracking update pipeline 202 or different filtering techniques and/or models from the object tracking update pipeline 202.

The fast object tracking update pipeline 204 may output the radar updated object perception tracks to prediction and/or planning systems 228. The prediction and/or planning systems may make operational decisions based on the radar updated object perception tracks, such as breaking, turning, increasing or decreasing speed, etc.

In the current example, the fast update pipeline 204 is performed using additional radar data but it should be understood that any other type of captured data may be used or incorporated into the fast update pipeline 204. For instance, image data, lidar data, position data, location data, etc. may be utilized. In one particular example, if image data is incorporated into the fast update pipeline 204, the image data may undergo some preprocessing prior to association at 220, however, the preprocessing may be less resource or time intensive than the preprocessing associated with 212.

Figure 3:
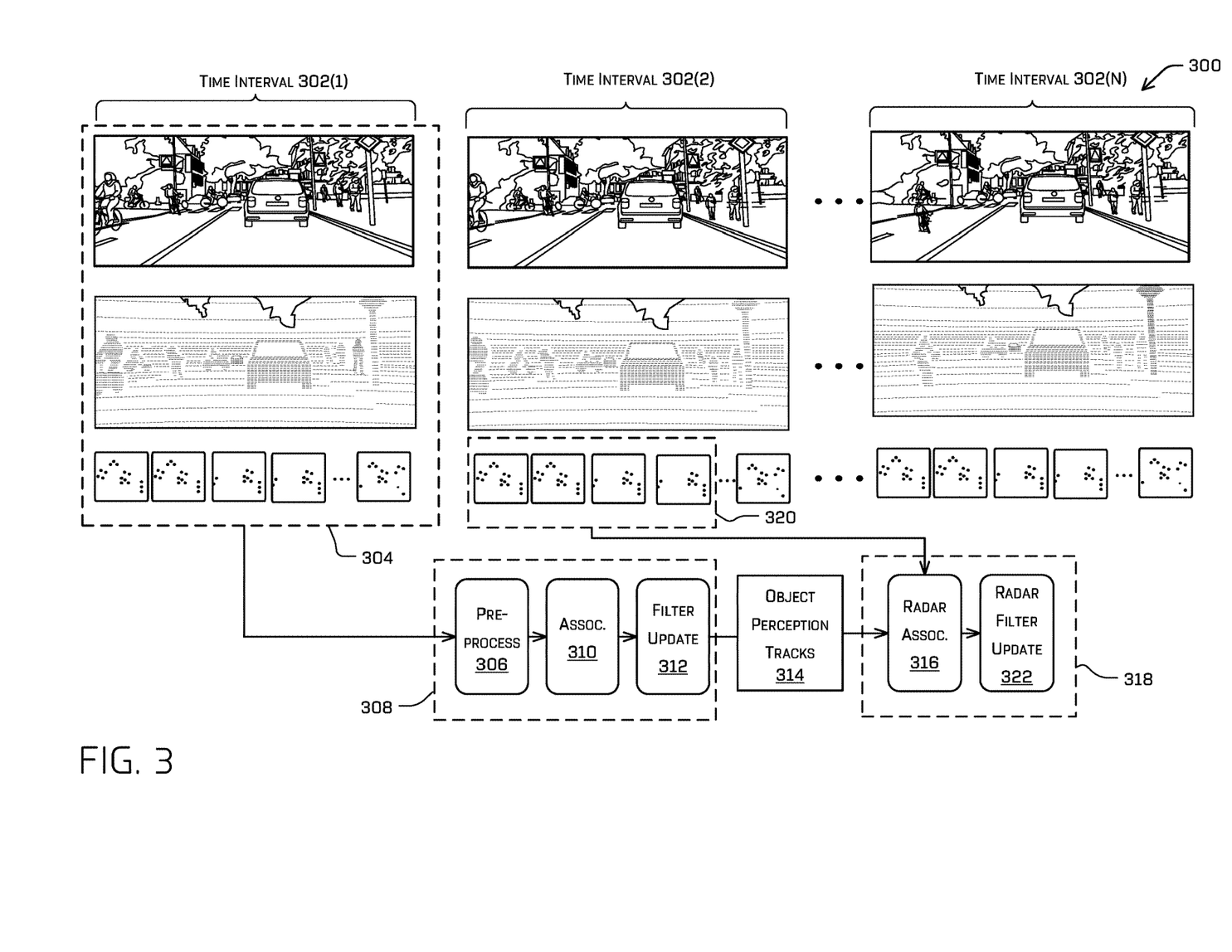
FIG. 3 is another example diagram illustrating an example process flow of an out of sequence perception system, as described herein.

FIG. 3 is another example diagram illustrating an example process flow 300 of an out of sequence perception system, as described herein. In the current example, sensors, such as image, video, lidar, and/or radar components, capture sensor data of the physical environment surrounding the vehicle. The sensor data may be captured in increments, generally referred to herein as time intervals. For instance, in the illustrated example, time intervals 302(1), 302(2), and 302(N) are shown.

In this example, the sensor data 304 collected during the first time interval 302(1) is provided to a preprocessor 306 (e.g., detection, filtering, segmentation, etc.) of a full object tracking update pipeline 308. The preprocessor 306 may identify and classify objects represented within the sensor data 304. In some cases, the preprocessor 306, as discussed above, may perform object segmentation, feature extraction, sparse features representation, pattern detection, white space detection, pixel correlation, feature mapping, etc. and utilize one or more neural networks, deep learning, and/or regression techniques.

The classified objects undergo association with the object perception tracks. For example, the association component 310 may associate the classified objects with an appropriate object perception track. After association is complete, the object tracks are filtered and updated by filter update component 312, as discussed above.

The object perception tracks 314 output of the full object tracking update pipeline 308 may be received by a radar association component 316 of a fast object tracking update pipeline 318. The radar association component 316 also receives radar data 320 captured while the full object tracking update pipeline 308 performed the processing to generate the object perception tracks 314. In the illustrated example, the radar data 320 is captured during the second time interval 302(2). However, it should be understood, that in some cases, such as the situation illustrated with respect to FIG. 1, the radar data 320 may include radar data collected during a third time interval. Alternatively, it should be understood, that in some cases, the radar data 320 may include a portion of the radar data collected during the second time interval 302(2).

The objects represented by the radar data 320 undergo association with the object perception tracks in a similar manner as the sensor data 304 during the full update. For example, the association component 310 may associate the objects represented within the radar data 320 with an appropriate object perception track. After association is complete, the object tracks may be filtered and updated by filter update component 322. The object perception tracks updated by the fast object tracking update pipeline 318 may then be provided or sent to a perception and/or planning system for use in operational decision making and planning.

Figure 4:
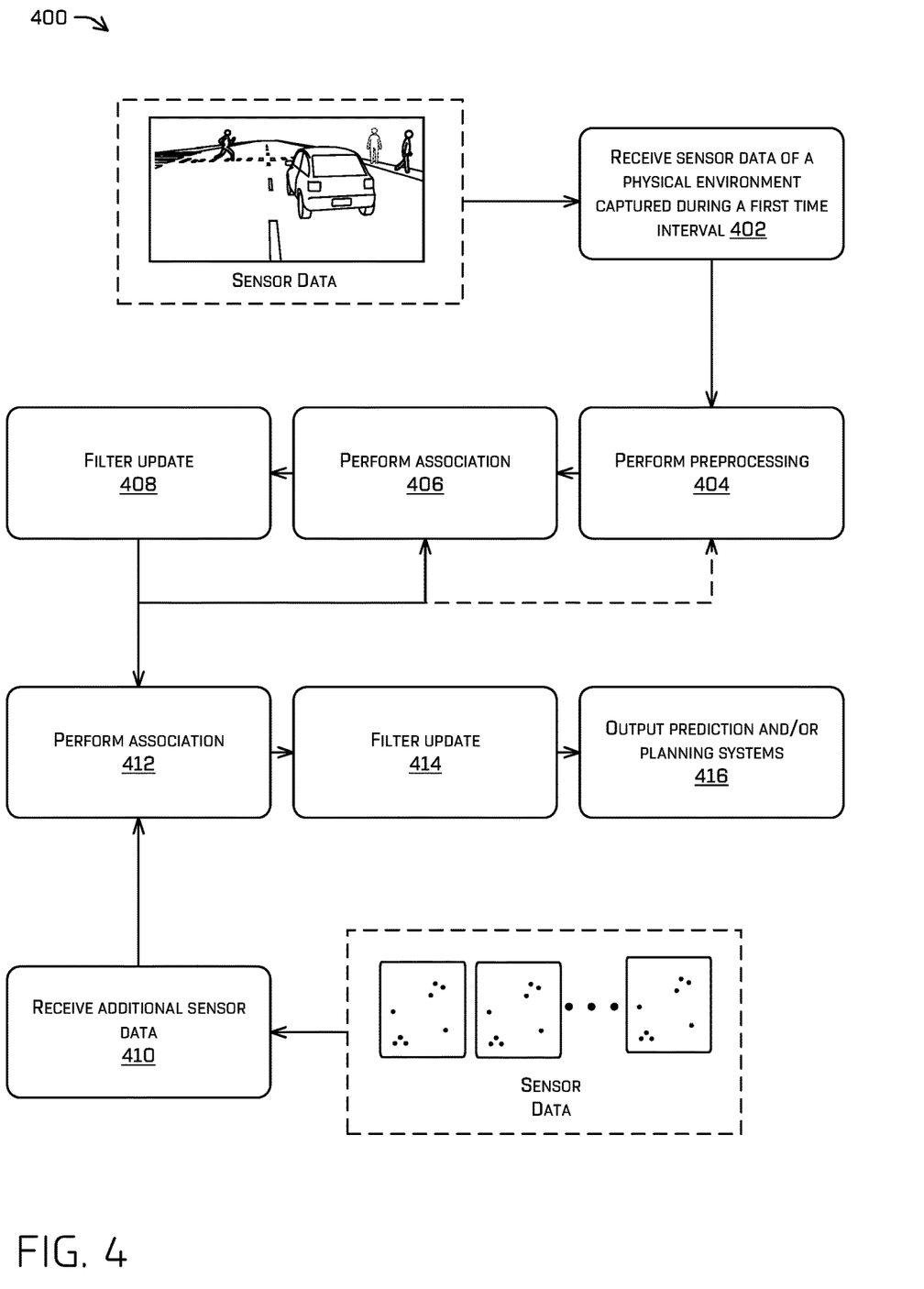
FIG. 4 is a flow diagram illustrating an example process of an out of sequence perception system for generating object perception tracks, as described herein.

FIG. 4 is a flow diagram illustrating an example process 400 of an out of sequence perception system for generating object perception tracks, as described herein. As discussed above, by incorporating a fast object tracking update pipeline into the out of sequence perception system, the recency of the sensor data used to generate the object perception tracks relied on by the prediction and/or planning system may be improved. In this manner, the object perception tracks received by the prediction and/or planning system is more representative of the actual physical environment and better operational decisions can be made.

At 402, the out of sequence perception system receives sensor data of a physical environment captured during a first time interval. In some cases, the sensor data may include video and/or image data, lidar data, and/or radar data. In other cases, the sensor data may also include orientation data, inertial measurement unit data, gyroscope data, acerbation data, gravitational data, position or GPS data, wheel encoder data, etc.

At 404, the out of sequence perception system performs preprocessing on the sensor data to detect, filter, segment, and/or classify one or more physical objects represented by the data, as discussed above with respect to 212 of FIG. 2 and 306 of FIG. 3. In some cases, the out of sequence perception system may perform video and/or image data preprocessing, lidar data preprocessing, and/or radar data preprocessing. In the implementations in which additional types of data are available, the out of sequence perception system may perform additional types of preprocessing.

At 406, the out of sequence perception system performs association between the classified objects and existing object perception tracks received from a completion of a preceding full update, as discussed above with respect to 214 of FIG. 2 and 310 of FIG. 3.

At 408, the out of sequence perception system performs filter updates on the object perception tracks based at least in part on the associations of the objects represented in the sensor data and the existing object perception tracks identified during association, as discussed above with respect to 216 of FIG. 2 and 312 of FIG. 3. The full updated object perception tracks are returned to 406 for use as the new existing object perception tracks during the subsequent time interval. In some cases, the full updated object perception tracks may also be returned to 404 for use during preprocessing.

At 410, the out of sequence perception system receives additional sensor data (e.g., radar data or image data) of the physical environment during one or more time intervals subsequent to the first time interval. The additional radar data may include a portion of or all of the radar data collected while the out of sequence perception system performs preprocessing 404, association 406, and filter update 408. In this way, the additional radar data is between 100 and 150 milliseconds more recent than the sensor data received at 402.

At 412, the out of sequence perception system performs association between the objects represented by the additional radar data and the full updated object perception tracks received from 408, as discussed above with respect to 220 of FIG. 2 and 316 of FIG. 3. In one particular example, the sensor data may be radar data and the association preformed as part of 412 may be a radar association that does not require preprocessing as does other types of preprocessing.

At 414, the out of sequence perception system performs filter update on the object perception tracks based at least in part on the associations of the objects represented in the additional senor data and the full updated object perception tracks identified during association 412 to generate fast update object perception tracks, as discussed above with respect to 224 of FIG. 2 and 322 of FIG. 3. Thus, it should be understood, that the fast update object perception tracks are updated based on data that is within 50 to 100 milliseconds old.

At 416, the out of sequence perception system outputs the fast update object perception tracks to prediction and/or planning systems. The prediction and/or planning systems may then make operational decisions based on the fast update object perception tracks. In some examples, a prediction system may estimate current, and/or predict future, characteristics or states of objects (e.g., vehicles, pedestrians, animals, etc.), such as a six degree of freedom (DoF) pose, speed, trajectory, velocity, yaw, yaw rate, roll, roll rate, pitch, pitch rate, position, acceleration, or other characteristics, based at least in part on the fast update object perception tracks. For instance, the prediction system may receive the fast update object perception tracks and predict one or more of the foregoing characteristics of the object. In some cases, the prediction may be made based on multiple fast update object perception tracks, such as the preceding two, three, four, five, etc. fast update object perception tracks received from the out of sequence perception system.

In some examples, the planning system may determine a path, acceleration/deceleration, speed, among others for the vehicle to follow to traverse through the physical environment. For example, the planning system may determine various routes and trajectories and at various levels of detail. In some cases, the planning component may determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component may generate an instruction for guiding the autonomous vehicle along at least a portion of the route from the first location to the second location.

In an alternative implementation, the out of sequence perception system may also receive additional video and/or image data at 410. The additional video and/or image data may also be captured during one or more time intervals subsequent to the first time interval. In this implementation, the radar association of 412 and the filter and update 414 may be performed using both the raw radar data and the raw video and/or image data. In some cases, the association performed on the raw video and/or image data may include 2-dimensional analysis, detecting lateral movement, detecting changes in covariance, etc.

In another alternative implementation, the fast update object perception tracks may be received by 404 or 406 in addition to or in combination with the full update from 408 and utilized as part of the preprocessing and/or association respectively.

Figure 5:
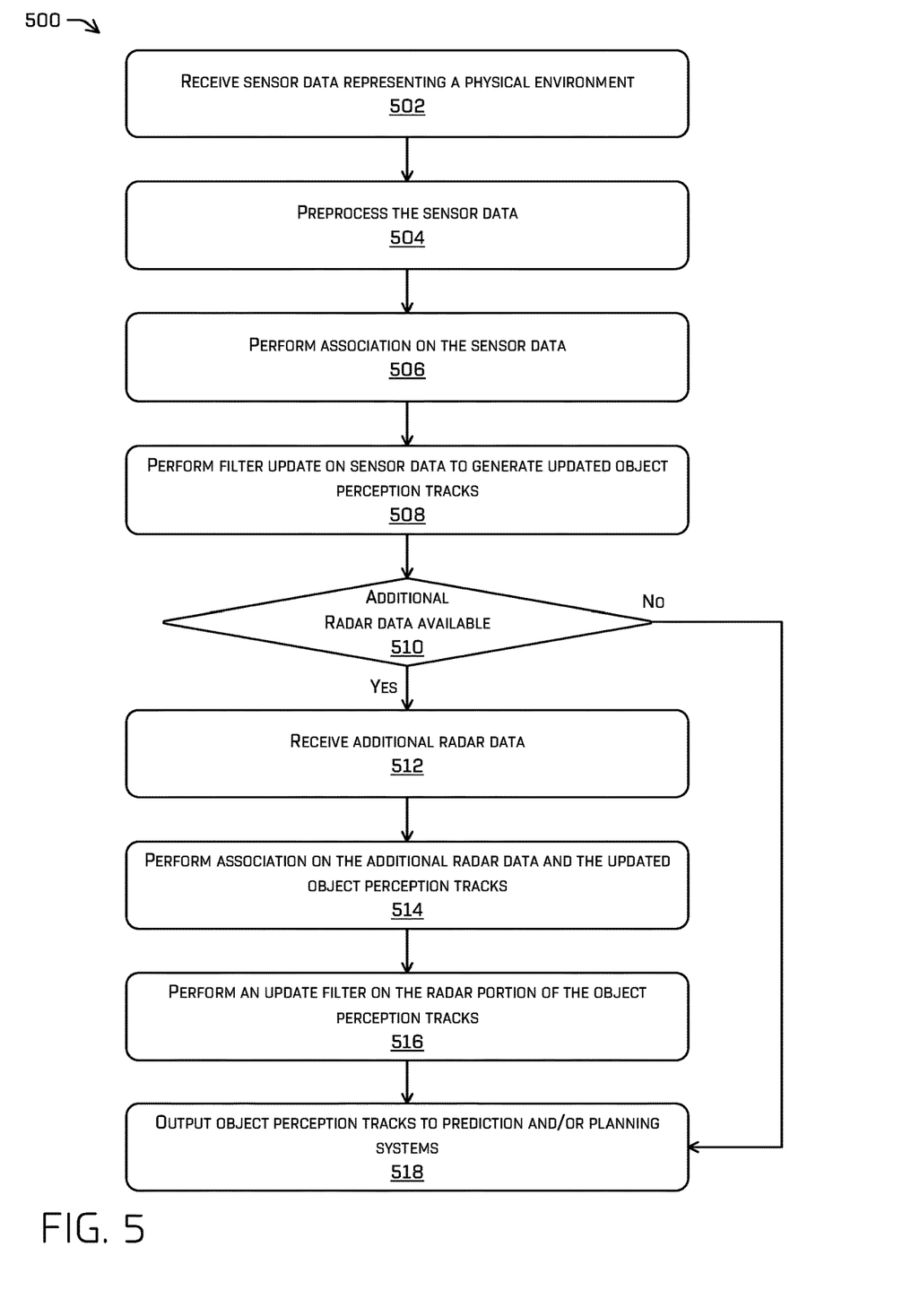
FIG. 5 is another flow diagram illustrating an example process of an out of sequence perception system for generating object perception tracks, as described herein.

FIG. 5 is another flow diagram illustrating an example process 500 of an out of sequence perception system for generating object perception tracks, as described herein. As discussed above, the out of sequence perception system utilizes a fast object tracking update pipeline in addition to a full object tracking update pipeline to improve a recency of the sensor data used to generate the object perception tracks received by the prediction and/or planning system.

At 502, the out of sequence perception system receives sensor data representative of a physical environment. As discussed above with respect to FIGS. 1-4, the sensor data may be collected during a first time interval and may include one or more of video and/or image data, lidar data, and/or radar data as well as other types of sensor data.

At 504, the out of sequence perception system preprocesses the sensor data (e.g., detects, filters, segments, etc. the sensor data) and, at 506, the out of sequence perception system performs association on the preprocessed sensor data. For example, the out of sequence perception system may perform classification and association on the sensor data as discussed above with respect to FIGS. 1-4.

At 508, the out of sequence perception system performs filter updates on the sensor data to generate a full updated object perception track. In some cases, the filter updates may be based at least in part on the associations of the objects and an object perception track output during a preceding time interval.

At 510, the out of sequence perception system may determine if additional radar data is available. If there is no additional radar data available, then the process 500 proceeds to 518 and the out of sequence perception system outputs the object perception track to prediction and/or planning systems. Otherwise, the process 500 proceeds to 512.

At 512, the out of sequence perception system receives additional radar data of the physical environment during one or more time intervals subsequent to the first time interval. The additional radar data may include a portion of or all of the radar data collected while the out of sequence perception generates the full updated object perception tracks. Thus, the additional 100 to 150 milliseconds worth of radar data may have been collected.

At 514, the out of sequence perception system performs radar association based at least in part on the additional radar data and the full updated object perception tracks and, at 516, the out of sequence perception system performs filter update on the radar portion of the object perception tracks, as discussed above with respect to FIGS. 1-4.

At 518, the out of sequence perception system outputs the object perception tracks to prediction and/or planning systems, as discussed above with respect to FIGS. 1-4. The outputted object perception tracks are in some cases, the fast update object perception tracks and in other cases, such as when no additional radar data is available, the full updated object perception tracks.

Figure 6:
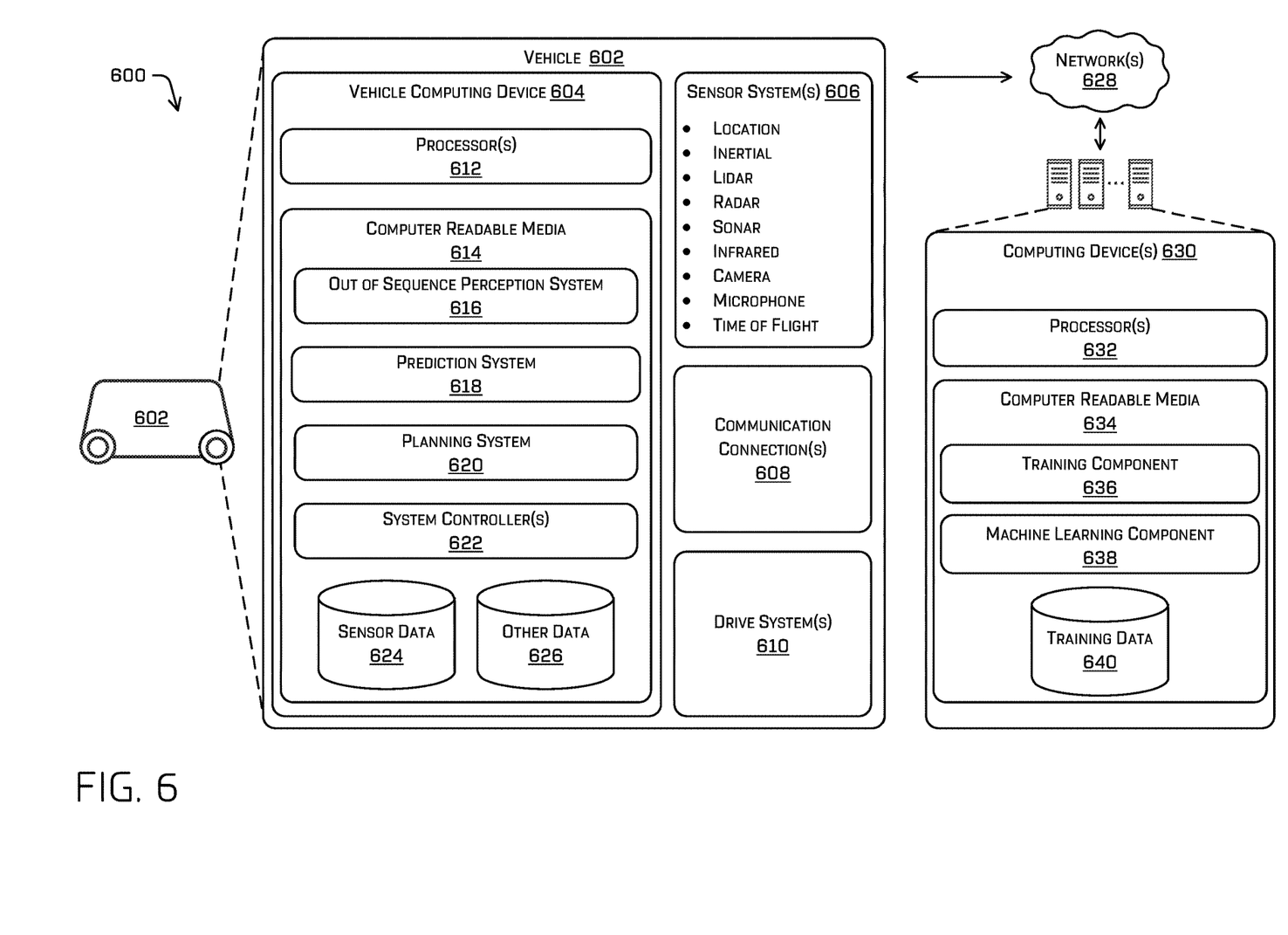
FIG. 6 is a block diagram of an example system for implementing the out of sequence perception system, described herein.

FIG. 6 is a block diagram of an example system 600 for implementing the techniques described herein, in accordance with embodiments of the disclosure. In some examples, the system 600 may include one or multiple features, components, and/or functionality of embodiments described herein with reference to FIGS. 1-5. In some embodiments, the system 600 may include a vehicle 602. The vehicle 602 may include a vehicle computing device 604, one or more sensor systems 606, one or more communication connections 608, and one or more drive systems 610.

The vehicle computing device 604 may include one or more processors 612 and computer readable media 614 communicatively coupled with the one or more processors 612. In the illustrated example, the vehicle 602 is an autonomous vehicle; however, the vehicle 602 could be any other type of vehicle, or any other system (e.g., a robotic system, a camera enabled smartphone, etc.). In the illustrated example, the computer readable media 614 of the vehicle computing device 604 stores an out of sequence perception system 616, a prediction system 618, a planning system 620, one or more system controllers 622 as well as sensor data 624 and other data 626. Though depicted in FIG. 6 as residing in computer readable media 614 for illustrative purposes, it is contemplated that the out of sequence perception system 616, the prediction system 618, the planning system 620, the one or more system controllers 622 as well as the sensor data 624 and the other data 626, may additionally, or alternatively, be accessible to the vehicle 602 (e.g., stored on, or otherwise accessible by, computer readable media remote from the vehicle 602).

In at least one example, the out of sequence perception system 616 may be configured to receive sensor data 624 captured during one or more time interval intervals associated with the sensor system 606. The out of sequence perception system 616 may implement both a full object tracking update pipeline and a fast object tracking update pipeline. As discussed above with respect to FIGS. 1-5, the full object tracking update pipeline generates updated object prediction tracks that are used as an input to each iteration of the full object tracking update pipeline and/or the fast object tracking update pipeline and the fast object tracking update pipeline generates fast updated object prediction tracks that are used as inputs to the prediction system 618 and/or the planning system 620.

The prediction system 618 may be configured to estimate current, and/or predict future, characteristics or states of objects (e.g., vehicles, pedestrians, animals, etc.), such as pose, speed, trajectory, velocity, yaw, yaw rate, roll, roll rate, pitch, pitch rate, position, acceleration, or other characteristics, based at least in part on the object prediction tracks output by the out of sequence perception system 616.

The planning system 620 may determine a path for the vehicle to follow to traverse through the physical environment. For example, the planning system 620 may determine various routes and trajectories and various levels of detail. For example, the planning system 620 may determine a route to travel from a current location to a target location. For the purpose of this discussion, a route may include a sequence of waypoints for travelling between two locations.

In at least one example, the vehicle computing device 604 can include one or more system controllers 622, which can be configured to control steering, propulsion, braking, safety, emitters, communication, and other systems of the vehicle 602. These system controller(s) 622 may communicate with and/or control corresponding systems of the drive system(s) 610 and/or other components of the vehicle 602.

In some instances, aspects of some or all of the components discussed herein can include any models, algorithms, and/or machine learning algorithms. For example, in some instances, components in the computer readable media 614 (and the computer readable media 634, discussed below) such as the out of sequence perception system 616, the prediction system 618, and/or planning system 620, and may be implemented as a neural network. For instance, the out of sequence perception system 616 may comprise a machine learned model (e.g., neural network) which has been trained to predict speed, trajectory, and/or other characteristics of a pedestrian (or other object) based on image data.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 606 can include multiple instances of each of these or other types of sensors. For instance, the lidar sensors may include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 may provide input to the vehicle computing device 604. Additionally, or alternatively, the sensor system(s) 606 can send sensor data, via the one or more networks 628, to the one or more computing device(s) at a particular frequency, after a lapse of a predetermined period of time, in near real-time, etc.

The vehicle 602 can also include one or more communication connection(s) 608 that enable communication between the vehicle 602 and one or more other local or remote computing device(s). For instance, the communication connection(s) 608 may facilitate communication with other local computing device(s) on the vehicle 602 and/or the drive system(s) 610. Also, the communication connection(s) 608 may allow the vehicle 602 to communicate with other nearby computing device(s) (e.g., other nearby vehicles, traffic signals, etc.). The communications connection(s) 608 also enable the vehicle 602 to communicate with remote teleoperations computing device or other remote services.

The communications connection(s) 608 may include physical and/or logical interfaces for connecting the vehicle computing device 604 to another computing device (e.g., computing device(s) 630) and/or a network, such as network(s) 628. For example, the communications connection(s) 608 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 610. In some examples, the vehicle 602 may have a single drive system 610. In at least one example, if the vehicle 602 has multiple drive systems 610, individual drive systems 610 can be positioned on opposite ends of the vehicle 602 (e.g., the front and the rear, etc.). In at least one example, the drive system(s) 610 can include one or more sensor systems 606 to detect conditions of the drive system(s) 610 and/or the surroundings of the vehicle 602, as discussed above. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 610. In some cases, the sensor system(s) 606 on the drive system(s) 610 can overlap or supplement corresponding systems of the vehicle 602.

In at least one example, the components discussed herein can process sensor data 624, as described above, and may send their respective outputs, over the one or more network(s) 628, to one or more computing device(s) 630. In at least one example, the components discussed herein may send their respective outputs to the one or more computing device(s) 630 at a particular frequency, after a lapse of a predetermined period of time, in near real-time, etc.

In some examples, the vehicle 602 can send sensor data to one or more computing device(s) 630 via the network(s) 628. In some examples, the vehicle 602 can send raw sensor data 624 to the computing device(s) 630. In other examples, the vehicle 602 can send processed sensor data 624 and/or representations of sensor data (for instance, the object perception tracks) to the computing device(s) 630. In some examples, the vehicle 602 can send sensor data 624 to the computing device(s) 630 at a particular frequency, after a lapse of a predetermined period of time, in near real-time, etc. In some cases, the vehicle 602 can send sensor data (raw or processed) to the computing device(s) 630 as one or more log files.

The computing device(s) 630 may include processor(s) 632 and computer readable media 634 storing a training component 636, a machine learning component 638, as well as training data 640. The training component 636 may generate the training data 640 using the sensor data 624 received from one or more vehicles 602. For instance, the training component 636 may label data representative of an object with one or more measured parameters or characteristics of the object in the image. The training component 636 may then use the training data 640 to train the machine learning component 638 to predict motion states of predict current or future speed, trajectory, and/or any other characteristics of objects based on pose of the object depicted in image data.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 612 of the vehicle 602 and the processor(s) 632 of the computing device(s) 630 may be any suitable processor capable of executing instructions to process data and perform operations as described herein. By way of example and not limitation, the processor(s) 612 and 632 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 614 and 634 are examples of non-transitory computer-readable media. The computer readable media 614 and 634 can store an operating system and one or more software applications, instructions, programs, and/or data to implement the methods described herein and the functions attributed to the various systems. In various implementations, the computer readable media can be implemented using any suitable computer readable media technology, such as static random access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 6 is illustrated as a distributed system, in alternative examples, components of the vehicle 602 can be associated with the computing device(s) 630 and/or components of the computing device(s) 630 can be associated with the vehicle 602. That is, the vehicle 602 can perform one or more of the functions associated with the computing device(s) 630, and vice versa. Further, aspects of machine learning component 638 can be performed on any of the devices discussed herein.

Figure 7:
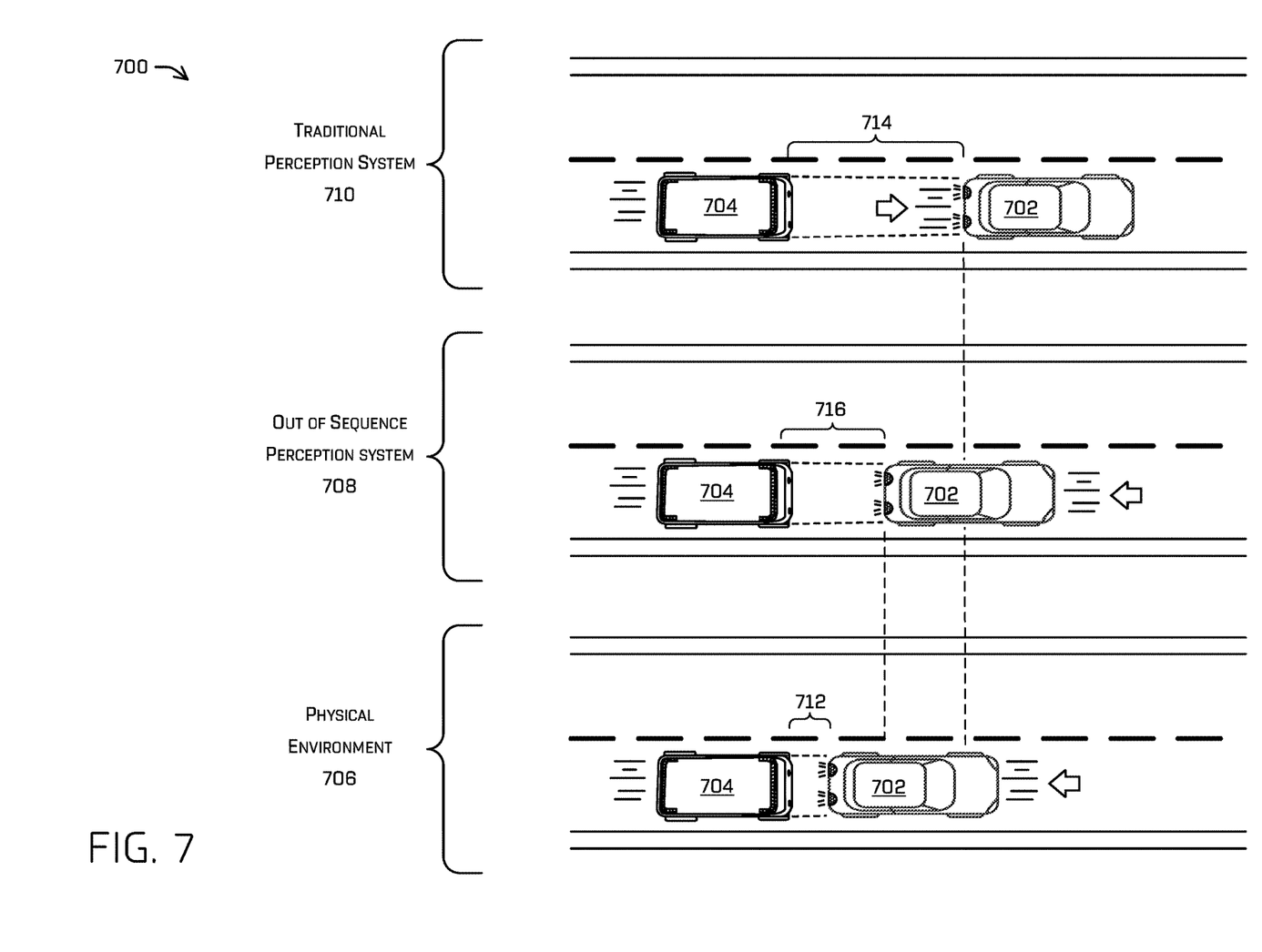
FIG. 7 is a pictorial diagram illustrating an example implementation of the out of sequence perception system in an autonomous vehicle, as described herein.

FIG. 7 is a pictorial diagram 700 illustrating a benefit of implementing the out of sequence perception system of FIGS. 1-5 in an autonomous vehicle, as described herein. As illustrated, a preceding vehicle 702 is shown in relation to an autonomous vehicle 704 (e.g., vehicle 602) with respect to the physical environment 706, as predicted by the out of sequence perception system 708, discussed above, and as predicted by a traditional perception system 710.

As the current example illustrates with respect to the physical environment 706, the preceding vehicle 702 is applying the break, has a trajectory in the rearward direction, and is at a distance 712 from the vehicle 704. However, as discussed above, the vehicle 704 is making operational decisions based on sensor data collected at a time preceding the present. Thus, the preceding vehicle 702 is actually closer to the vehicle 704 than the vehicle 704 is predicting. For instance, as discussed above and as illustrated by 710, if the vehicle 704 was relying on the traditional perception systems (which may be based on sensor data collected greater than 200 milliseconds before the present time), the vehicle 704 may predict the preceding vehicle 702 is a distance 714 from the vehicle 704. Further, as the preceding vehicle 702 may not have actuated the breaks, prior to 200 milliseconds ago, the vehicle 704 using the traditional perception system 710 may predict the trajectory of the preceding vehicle 702 in a forward direction (e.g., opposite the actual rearward direction of the preceding vehicle 702). In this situation, an accident may occur.

However, as the vehicle 704 is implementing the out of sequence perception system 708, the vehicle 704 while still making operational decisions that are based on sensor data collected at a time preceding the present time (e.g., 50 to 100 milliseconds ago), the vehicle 704 is making operational decisions based on far more recent data. Thus, the vehicle 704, described herein, may predict the preceding vehicle 702 is at a distance 716 and has a trajectory in the rearward direction. In this example, the vehicle 704 may respond by breaking and slowing its own trajectory, thereby preventing any potential accident.

EXAMPLE CLAUSES

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

- A. A system comprising: one or more processors; and one or more non-transitory computer readable media storing instructions executable by the one or more processors, wherein the instruction, when executed, cause the system to perform operations comprising: receiving first light detection and ranging (lidar) data captured by a first sensor of an autonomous vehicle during a first period of time; receiving first radar data captured by a second sensor of the autonomous vehicle during the first period of time; updating, during a second period of time and based at least in part on the first lidar data and the first radar data, an object perception track to generate a first updated object perception track, the object perception track including historical object data and current object data based on the first lidar data and the first radar data; receiving second radar data captured by the second sensor during a first portion of the second period of time; updating, during a second portion of the second period of time and based at least in part on the second radar data, the first updated object perception track to generate a second updated object perception track; sending the second updated object perception track to a second system; and controlling the autonomous vehicle based at least in part on the second updated object perception track.
- B. The system of paragraph A, the operations further comprising: receiving second lidar data captured by the first sensor during the second period of time; updating, during a third period of time and based at least in part on the second lidar data and the second radar data, the first updated object perception track to generate a third updated object perception track; receiving third radar data captured by the second sensor during a first portion of the third period of time; updating, during a second portion of the third period of time and based at least in part on the third radar data, the third updated object perception track to generate a fourth updated object perception track; and sending the fourth updated object perception track to the second system.
- C. The system of paragraph A, the operations further comprising: receiving image data captured by a third sensor of the autonomous vehicle during the first period of time; and wherein updating the object perception track to generate the first updated object perception track is based at least in part on the image data.
- D. The system of paragraph A, wherein the second system is a planning system and wherein the planning system determines a path of the autonomous vehicle based at least in part on the second updated object perception track.
- E. The system of paragraph A, wherein the second system the operations associated with updating the object perception track to generate the first updated object perception track further comprises: preprocessing an object represented in one or more of the lidar data or the radar data; associating the object with the object perception track; determining, as a current object state and based at least in part on the lidar data and the radar data, one or more of a position, orientation, velocity, or acceleration associated with the object; and updating the object perception track to include the current object state.
- F. A method comprising: one or more of receiving or determining initial object data associated with an object in an environment; receiving first sensor data captured by a first sensor during a first period of time, the first sensor data having a first type; receiving second sensor data captured by a second sensor during the first period of time, the second sensor data having a second type; determining, based at least in part on the first sensor data and the second sensor data and during a second period of time, first object data associated with the object, the second period of time less than or equal to the first period of time; receiving third sensor data captured by the second sensor during the second period of time, the third sensor data having the second type; determining, during a third period of time and based at least in part on the first object data and the third sensor data, second object data of the object in the environment, the third period of time being less than or equal to the second period of time; and controlling a vehicle based at least in part on the second object data.
- G. The method of paragraph F, wherein determining the first object data comprises preprocessing the first sensor data.
- H. The method of paragraph F, preprocessing the first sensor data includes at least one of detecting, classifying, or segmenting the first sensor data.
- I. The method of paragraph F, wherein the second period of time plus the first period of time are less than or equal to the first period of time.
- J. The method of paragraph F, wherein the first object data and the second object data comprises one or more positions, orientations, velocities, or accelerations associated with the object over a period of time.
- K. The method of paragraph F, further comprising: receiving fourth sensor data captured by a third sensor during the first period of time, the fourth sensor data comprising image data; and wherein the first sensor data comprises lidar data, and the second sensor data comprises radar data, and determining the first object data is based at least in part on the first sensor data, the second sensor data, and the fourth sensor data.
- L. The method of paragraph F, wherein the third sensor data comprises radar data.
- M. The method of paragraph F, wherein: determining the first object data comprises preprocessing the first sensor data and performing association on the first sensor data and the second sensor data with the initial object data; and determining the second object data comprises associating the third sensor data with the first object data and filtering the third sensor data.
- N. The method of paragraph F, wherein the first period of time is equal to a predetermined time interval and the second period of time and the third period of time are less than the predetermined time interval.

O. A non-transitory computer-readable medium storing instructions that, when executed, cause one or more processors to perform operations comprising: receiving first sensor data captured by one or more sensors during a first period of time; determining, during a second period of time, based at least in part on the first sensor data, and using a first set of algorithms, object data associated with an object in an environment; receiving second sensor data captured by the one or more sensors during a second period of time; determining, during a third period of time, based at least in part on a portion of the second sensor data, and using a second set of algorithms, second object data, the second set of algorithms being a subset of the first set of algorithms; and sending the second object data to a second system.

P. The non-transitory computer-readable medium of paragraph O, wherein the second period of time and the third period of time are at least partially contemporaneous; and the third period of time is less than or equal to the second period of time.

Q. The non-transitory computer-readable medium of paragraph O, wherein: the first set of algorithms comprises at least a machine learned model, and the second set of algorithms comprises a Kalman filter.

R. The non-transitory computer-readable medium of paragraph O, wherein the third period of time plus the second period of time are less than or equal to the first period of time.

S. The non-transitory computer-readable medium of paragraph O, wherein the first sensor data further comprises first radar data, first image data, and first light detection and ranging (lidar) data, and the portion of the second sensor data comprises second radar data.

T. The non-transitory computer-readable medium of paragraph O, wherein the second system is configured to control at least one operation of an autonomous vehicle based at least in part on the second object data.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In some cases, the frequency or speed of updates is limited (e.g., due to limited sample rates or speeds of sensors or detectors or limited by computational considerations), some aspects of the surrounding physical environment may change significantly between the updates. In particular, a rapidly braking vehicle has undergoes a rapid change in speed and trajectory. In a particular example, a perception system may have a monitoring update cycle period of about 100 milliseconds, whereas a vision system (e.g., which includes one or more cameras) may have an update cycle period of about 150 milliseconds. In such a case, several updates of a perception system may be necessary to detect motion of an object. Thus, for a perception system that updates every 100 milliseconds, it may take 200-300 milliseconds or more to detect motion of the object. On the other hand, according to the techniques described herein, the out of sequence perception system may be predicted in as little as 50-150 milliseconds. This may increase the speed with which the vehicle can react to actions of pedestrians and/or may increase the confidence with which the vehicle plans a route through the environment. In other examples, the relative update speeds of the perception and vision systems may be greater or lesser than the examples provided.

As a non-limiting example, techniques described herein may be performed, at least in part, by a computing device of an autonomous vehicle, which may receive sensor data and detect one or more objects in an environment and/or determine attributes or object parameters of the one or more objects in the physical environment. Object parameters may comprise velocity, acceleration, position, classification, and/or extents of each of the one or more objects, in addition to any uncertainty information associated therewith. Sensor data captured by the autonomous vehicle may include light detection and ranging (lidar) sensor data, radio detection and ranging (radar) sensor data, sound navigation and ranging (sonar) sensor data, image data, time of flight data, and the like. In some cases, sensor data may be provided to a perception system configured to determine a type of object (e.g., vehicle, pedestrian, bicycle, animal, parked car, tree, building, and the like) in the environment. Further, the out of sequence perception system may determine, based on the sensor data, movement information about the object in the physical environment.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A method comprising:
   receiving first sensor data captured by a first set of sensors of first sensor modalities, wherein the first set of sensors generate the first sensor data over a first time period;
   generating a track for an object based at least in part on the first sensor data;
   receiving second sensor data captured by a second sensor of a second sensor modality, wherein:
      the second sensor generates the second sensor data over a second time period that is less than the first time period, and
      the second sensor data is generated while third sensor data captured by the first set of sensors is unavailable due to the first set of sensors capturing the third sensor data over a third time period that is equal to the first time period;
   one of updating the track or generating a new track for the object based solely on the second sensor data; and
   controlling a vehicle based at least in part on at least one of the track or the new track.

2. The method of claim 1, wherein the second sensor modality is radar.

3. The method of claim 1, wherein generating the track comprises preprocessing the first sensor data, the preprocessing of the first sensor data includes at least one of detecting, classifying, or segmenting the first sensor data.

4. The method of claim 1, wherein the first sensor modalities include lidar or cameras.

5. The method of claim 1, wherein:
   the track is associated with the object over a period of time including the first time period; the track or the new track is associated with the object over the period of time including the first time period and the second time period; and
   the track and the new track comprise one or more of a position, an orientation, a velocity, or an acceleration.

6. The method of claim 1, wherein the first sensor data comprises at least one of lidar data, image data, or radar data.

7. The method of claim 1, further comprising one or more of receiving or determining initial object data associated with the object, wherein:
   generating the track comprises preprocessing the first sensor data and performing association on the first sensor data with the initial object data.

8. The method of claim 1, wherein the third time period at least partially overlaps with the second time period.

9. One or more non-transitory computer-readable media storing instructions that, when executed, cause one or more processors to perform operations comprising:
   receiving first sensor data captured by a first set of sensors of first sensor modalities, wherein the first set of sensors generate the first sensor data over a first time period;
   generating a first track for an object based at least in part on the first sensor data;
   receiving second sensor data captured by a second sensor of a radar sensor modality, wherein:
      the second sensor generates the second sensor data over a second time period that is less than the first time period,
      the second sensor data is generated while third sensor data captured over a third time period by the first set of sensors is unavailable, the third sensor data being unavailable due to the third time period being greater than the second time period; and
      generating a second track based at least in part on the second sensor data; and
   controlling a vehicle based at least in part on at least one of the first track or the second track.

10. The one or more non-transitory computer-readable media of claim 9, wherein the first sensor modalities include radar.

11. The one or more non-transitory computer-readable media of claim 9, wherein generating the first track comprises preprocessing the first sensor data, the preprocessing of the first sensor data includes at least one of detecting, classifying, or segmenting the first sensor data.

12. The one or more non-transitory computer-readable media of claim 9, wherein the first sensor modalities include lidar and cameras.

13. The one or more non-transitory computer-readable media of claim 9, wherein:
   the first track is associated with the object over a period of time including the first time period;
   the first track or the second track is associated with the object over the period of time including the first time period and the second time period; and
   the first track and the second track comprise one or more of a position, an orientation, a velocity, or an acceleration.

14. The one or more non-transitory computer-readable media of claim 9, wherein the first sensor data comprises at least one of lidar data, image data, or radar data.

15. The one or more non-transitory computer-readable media of claim 9, the operations further comprising one or more of receiving or determining initial object data associated with the object, wherein:
   generating the first track comprises preprocessing the first sensor data and performing association on the first sensor data with the initial object data.

16. The one or more non-transitory computer-readable media of claim 9, wherein the second track is determined by updating the first track using exclusively the second sensor data.

17. A system comprising:
   one or more processors; and
   one or more non-transitory computer-readable media storing instructions that, when executed, cause the one or more processors to perform operations comprising:
      receiving first sensor data captured by a first set of sensors of first sensor modalities, wherein the first set of sensors generate the first sensor data over a first time period;
      generating a track for an object based at least in part on the first sensor data;
      receiving second sensor data captured by a second sensor of a radar sensor modality, wherein:
         the second sensor generates the second sensor data over a second time period that is less than the first time period, and
         the second sensor data is generated while third sensor data captured by the first set of sensors is unavailable due to the third sensor data being captured over a third time period that is greater than the first time period; based at least in part on the second sensor data, at least one of generating:
an updated track for the object, or a new track for the object; and controlling a vehicle based at least in part on the updated track or the new track.

18. The system of claim 17, wherein the first sensor modalities include radar.

19. The system of claim 17, wherein:
the track is associated with the object over a period of time including the first time period;
the updated track or the new track is associated with the object over the period of time including the first time period and the second time period; and
the track, the updated track, and the new track comprise one or more of a position, an orientation, a velocity, or an acceleration.

20. The system of claim 17, wherein the updated track or the new track is determined by updating the track using exclusively the second sensor data.

* * * * *